US007854266B2

(12) United States Patent  (10) Patent No.: US 7,854,266 B2
Watson  (45) Date of Patent: Dec. 21, 2010

(54) SMOOTH BORE LATCH FOR TIE BACK RECEPTACLE EXTENSION

(75) Inventor: Brock W. Watson, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 131 days.

(21) Appl. No.: 12/238,992

(22) Filed: Sep. 26, 2008

(65) Prior Publication Data

US 2010/0078178 A1  Apr. 1, 2010

(51) Int. Cl.
*E21B 19/16* (2006.01)
(52) U.S. Cl. ..................... 166/380; 166/242.6
(58) Field of Classification Search ........... 166/380, 166/241.6, 242.6
See application file for complete search history.

(56) References Cited

U.S. PATENT DOCUMENTS

| | | | |
|---|---|---|---|
| 2,346,051 A | 4/1944 | Seamark | |
| 2,427,330 A | 9/1947 | Spencer | |
| 3,331,440 A | 7/1967 | Cochran | |
| 4,491,351 A | 1/1985 | Galle, Jr. et al. | |
| 5,211,226 A | 5/1993 | Hendrickson et al. | |
| 5,330,001 A * | 7/1994 | Baugh et al. ............... | 166/138 |
| 5,343,949 A | 9/1994 | Ross et al. | |
| 5,839,512 A | 11/1998 | Malone et al. | |
| 5,957,209 A * | 9/1999 | Burleson et al. ............ | 166/380 |
| 5,967,477 A | 10/1999 | Walmsley | |
| 6,056,061 A | 5/2000 | Ross et al. | |
| 6,830,106 B2 | 12/2004 | Cavender | |
| 6,920,927 B2 | 7/2005 | Hirth | |
| 7,552,764 B2 | 6/2009 | Weems et al. | |
| 2003/0205377 A1* | 11/2003 | Streater ...................... | 166/301 |
| 2004/0000791 A1 | 1/2004 | Setterberg, Jr. | |
| 2005/0056433 A1 | 3/2005 | Ring | |
| 2005/0217866 A1 | 10/2005 | Watson | |
| 2005/0263294 A1 | 12/2005 | Braddick | |
| 2006/0054330 A1 | 3/2006 | Ring | |
| 2006/0065403 A1 | 3/2006 | Watson | |
| 2006/0269360 A1 | 11/2006 | Rowley | |

OTHER PUBLICATIONS

Search Report issued Jan. 7, 2010, for European Patent Application No. 09170773.7, 6 pages.

Frank Hartley, "Hanger System Allows Expandable Patches, Liner Hangers," Offshore Magazine, dated Jun. 1, 2006, 4 pages, vol. 66, issue 6, PennWell Corp, Tulsa, OK.

(Continued)

*Primary Examiner*—William P Neuder
(74) *Attorney, Agent, or Firm*—Marlin R. Smith

(57) ABSTRACT

A tie back receptacle extension includes a stinger having a smooth bore latch assembly carried thereon which includes a wedge device and a ramp, and the ramp outwardly displaces the wedge device to secure the stinger within a substantially smooth bore. A smoothbore latch assembly includes a spiral wound spring received in a recess, and the recess and the spring extending circumferentially relative to a stinger. A ramp outwardly displaces the spring relative to the recess in response to displacement of the spring relative to the ramp. A method of securing a stinger within a substantially smooth bore includes: providing a latch assembly on the stinger; inserting the stinger into the bore; and engaging the latch assembly with the bore, thereby securing the stinger relative to the bore, without the latch assembly engaging any recess formed in the bore.

20 Claims, 7 Drawing Sheets

OTHER PUBLICATIONS

Matt Mason, "Mechanics of Manipulation," Lecture 16, Carnegie Mellon University, undated, 16 pages.

Martin Beveridge, et al., "A Novel Underbalanced-Perforating Gun Deployment System Using Production Packer Technology Successfully Completes Offshore Horizontal Wells in a Single Trip," Offshore Technology Conference paper 15210, May 5-8, 2003, 13 pages, Houston, Texas.

PBR Seal Assembly Drawing No. 212PBA191-A, Halliburton Energy Services, Inc., Apr. 25, 2007, 1 page, Houston, Texas.

7⅝" Ratch-Latch Seal Assembly Drawing No. 213 RLA 7500-E, Halliburton Energy Services, Inc., Dec. 13, 1995, 1 page, Dallas, Texas.

Clothesline Tightener part No. 7097 from The Lehigh Group, Internet Advertisement, undated, 1 page.

* cited by examiner

SMOOTH BORE LATCH FOR TIE BACK RECEPTACLE EXTENSION

BACKGROUND

The present disclosure relates generally to equipment utilized and operations performed in conjunction with a subterranean well and, in an embodiment described herein, more particularly provides a smooth bore latch for a tie back receptacle extension.

A tie back receptacle and associated tie back liner may be used to isolate casing above a liner hanger from pressure within the casing. However, the tie back liner will elongate and shrink due to thermal and pressure effects, and so a relatively long tie back liner will require that its seal assembly be received in a correspondingly long tie back receptacle.

Unfortunately, where a liner hanger is of the expandable type, only a relatively short tie back receptacle is typically provided. Thus, it is desirable to be able to install a tie back receptacle extension in the liner hanger, in order to provide for large seal assembly displacement therein, when a relatively long tie back liner is to be used.

However, due to the relatively thin wall thickness of an expandable liner hanger, it is undesirable to cut grooves, threads, etc. into the tie back receptacle for a conventional latch to secure the tie back receptacle extension. It is also undesirable to increase the wall thickness of the liner hanger, since this would make it more difficult to expand the liner hanger and/or would reduce the through bore of the liner hanger.

Therefore, it will be appreciated that improvements are needed in the art of installing tie back receptacle extensions. These improvements will be useful in other fields of the subterranean well art, as well.

SUMMARY

In the present specification, apparatus and methods are provided which solve at least one problem in the art. One example is described below in which a stinger is secured within a smooth bore using a latch assembly which grips the bore with a wedge and ramp arrangement. Another example is described below in which the wedge rotates across a surface of the ramp in order to extend the wedge outward into engagement with the smooth bore.

In one aspect, a tie back receptacle extension is provided which includes a stinger having a smooth bore latch assembly carried thereon. The smooth bore latch assembly includes a wedge device and a ramp. The ramp outwardly displaces the wedge device in order to secure the stinger within a substantially smooth bore.

In another aspect, a smooth bore latch assembly is provided which includes at least one spiral wound spring. The spring is received in at least one recess. The recess and the spring therein extend circumferentially relative to a stinger. A ramp is operative to outwardly displace the spring relative to the recess in response to displacement of the spring relative to the ramp.

In yet another aspect, a method of securing a stinger within a substantially smooth bore includes the steps of: providing a latch assembly on the stinger; inserting the stinger into the smooth bore; and engaging the latch assembly with the smooth bore, thereby securing the stinger relative to the smooth bore, without the latch assembly engaging any recess formed in the smooth bore.

These and other features, advantages, benefits and objects will become apparent to one of ordinary skill in the art upon careful consideration of the detailed description of representative embodiments hereinbelow and the accompanying drawings, in which similar elements are indicated in the various figures using the same reference numbers.

DETAILED DESCRIPTION

It is to be understood that the various embodiments described herein may be utilized in various orientations, such as inclined, inverted, horizontal, vertical, etc., and in various configurations, without departing from the principles of the present disclosure. The embodiments are described merely as examples of useful applications of the principles of the disclosure, which are not limited to any specific details of these embodiments.

In the following description of the representative embodiments of the disclosure, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
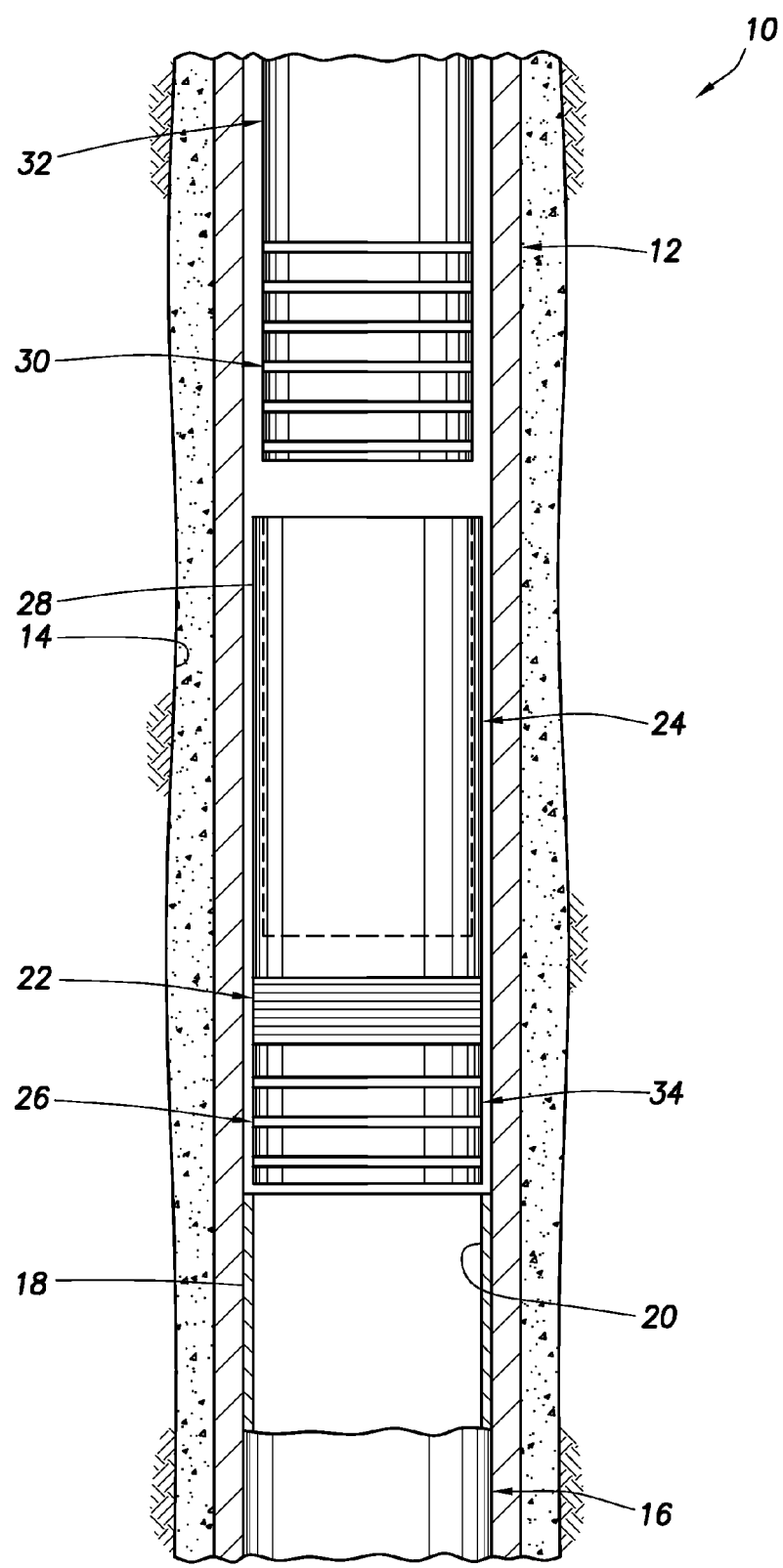
FIG. 1 is a schematic partially cross-sectional view of a well system and associated method embodying principles of the present disclosure.

Representatively and schematically illustrated in FIG. 1 is a well system 10 which embodies principles of the present disclosure. In the well system 10, a tubular string 12 (such as a casing or liner string) has been installed in a wellbore 14. The tubular string 12 may also be cemented in the wellbore 14, as depicted in FIG. 1.

A liner hanger 16 has been set in the tubular string 12. In this example, the liner hanger 16 is expanded within the tubular string 12, in order to seal and secure the liner hanger relative to the tubular string and, as is typical of such expandable liner hangers, a relatively short and thin walled tie back receptacle 18 is provided at an upper end of the liner hanger.

However, it should be clearly understood that it is not necessary for the liner hanger 16 to be expandable, or for the tie back receptacle 18 to be thin walled or relatively short, in keeping with the principles of this disclosure. Instead, the liner hanger 16 could be a conventionally set liner hanger or other well tool (such as a packer or bridge plug), and the tie back receptacle 18 could be relatively long or thick walled.

In addition, the tie back receptacle 18 could also or instead be of the type known as a polished bore receptacle. For the purposes of this disclosure, the terms "tie back receptacle" and "polished bore receptacle" are considered to be interchangeable.

The tie back receptacle 18 includes a substantially smooth internal bore 20. It is desired, in this example, not to weaken the receptacle 18 by cutting any grooves, threads or other recesses into the bore 20. The bore 20 is preferably free of any grooves, threads or other recesses, but could include small undulations, grooves, recesses, etc., if such are sufficiently small and appropriately configured that they would not damage a seal coming into contact with them.

A specially designed smooth bore latch assembly 22 is used which secures a tie back receptacle extension 24 to the receptacle 18, without the need for engaging any recesses in the receptacle 18 or bore 20. The extension 24 also includes a seal assembly 26 for sealingly engaging the bore 20, and an extended length tie back receptacle 28 for sealingly receiving a seal assembly 30 on a lower end of a tie back liner 32.

In actual practice, the seal assembly 30 on the tie back liner 32 would preferably already be engaged with the receptacle 28 when the extension 24 is run into the tubular string 12, but these elements of the system 10 are shown separated in FIG. 1 for clarity of description. Other extraneous details (such as a protective sleeve which covers the latch assembly 22 and prevents insertion of the latch assembly into the receptacle 18 until after the seal assembly 26 has been tested, a latch assembly which releasably secures the tie back liner 32 to the receptacle 28, etc.), not affecting the principles of this disclosure, have been omitted from FIG. 1 for clarity of illustration and description.

The lower portion of the extension 24 which is stung into the receptacle 18 comprises a stinger 34. The latch assembly 22 and the seal assembly 26 are carried on the stinger 34. Further details of these elements are representatively illustrated in cross-section in FIGS. 2A-C.

Figure 2A:
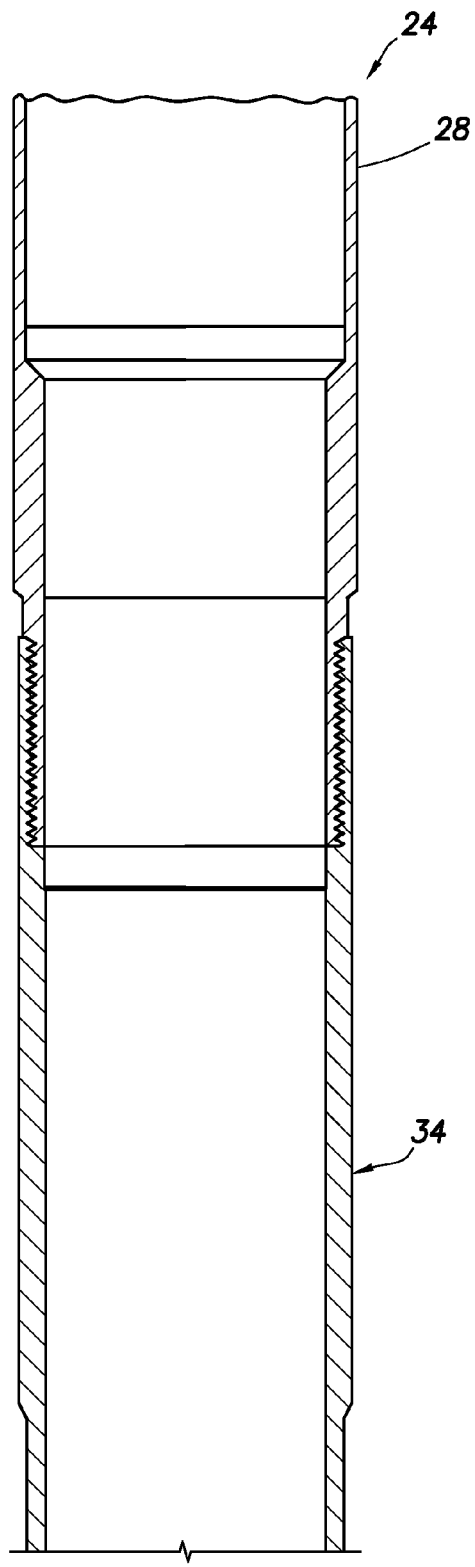
FIGS. 2A-C are schematic enlarged scale cross-sectional views of successive axial sections of a tie back receptacle and a tie back receptacle extension which may be used in the system of FIG. 1.

In FIG. 2A, it may be seen that the receptacle 28 is attached to the stinger 34 by a threaded connection. Of course, other types of attachment (welding, unitary construction, etc.) may be used if desired.

Figure 2B:
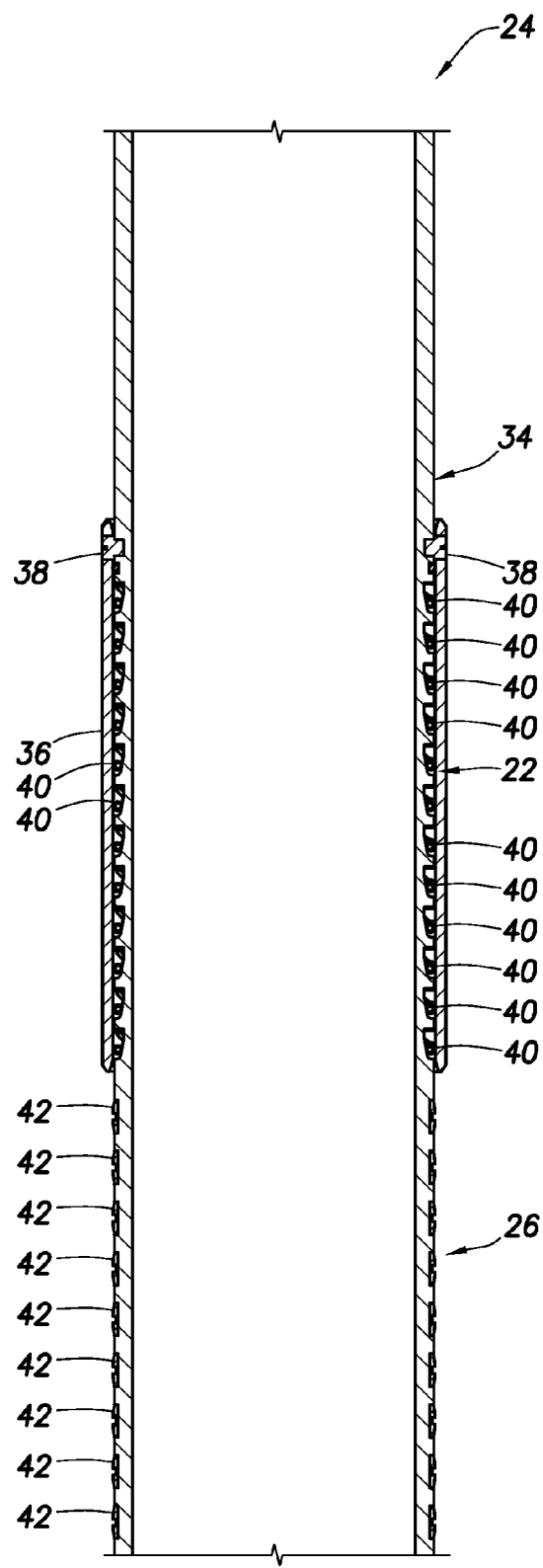

In FIG. 2B, the manner in which the latch assembly 22 and the seal assembly 26 are carried on the stinger 34 may be more clearly seen. In addition, the protective sleeve 36 covers the latch assembly 22 and is secured relative to the stinger 34 with shear pins 38, as depicted in FIG. 2B.

The latch assembly 22 preferably includes multiple latches 40, which are described more fully below. The seal assembly 26 preferably includes multiple seals 42. However, it should be understood that any number of latches 40, and any number of seals 42, including one, could be provided as desired.

Figure 2C:
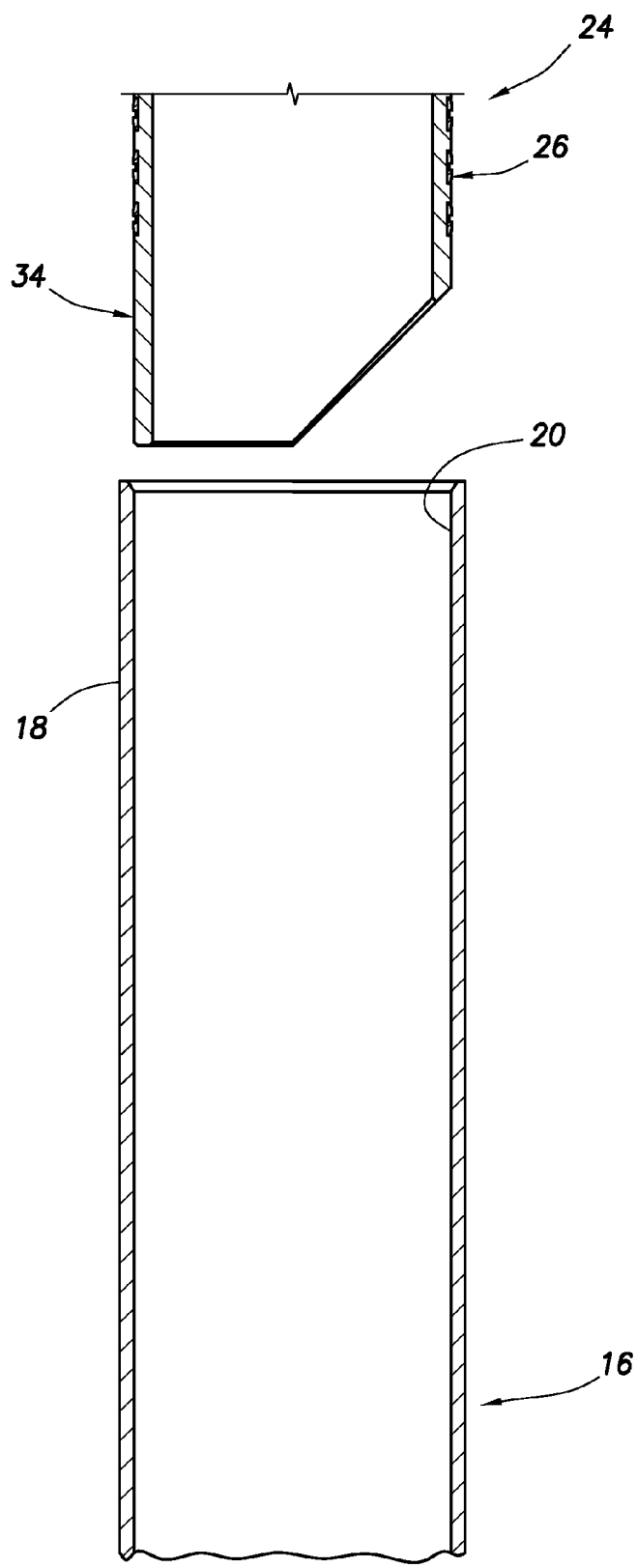

In FIG. 2C, the manner in which the stinger 34 is inserted into the bore 20 of the receptacle 18 can be seen. Note that the bore 20 is smooth, and is free of any grooves, threads or other types of recesses for engagement with the latch assembly 22.

Figure 3:
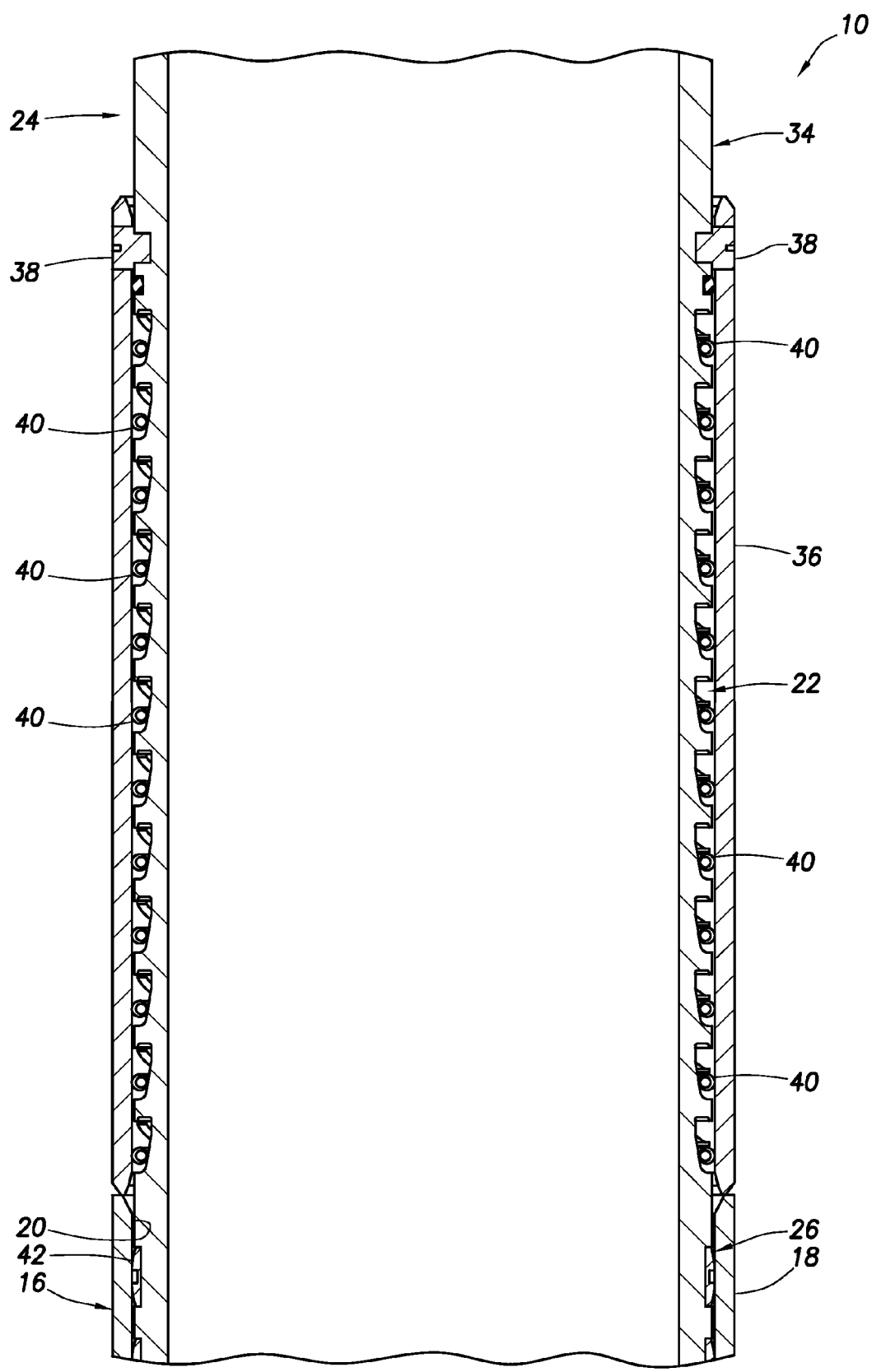
FIG. 3 is a further enlarged scale schematic cross-sectional view of a stinger of the tie back receptacle extension partially received in the tie back receptacle.

Referring additionally now to FIG. 3, the stinger 34 and receptacle 18 are representatively illustrated after the seal assembly 26 has been sealingly received within the bore 20. The sleeve 36 prevents further insertion of the stinger 34 into the receptacle 18, allowing the seals 42 to be pressure tested prior to engaging the latch assembly 22 with the bore 20.

After the seals 42 have been tested, sufficient force can be applied to the stinger 34 (for example, by slacking off on the tie back liner 32 at the surface to apply added weight to the extension 24) to shear the pins 38. The stinger 34 with the latch assembly 22 will then be received fully within the bore 20.

Figure 4:
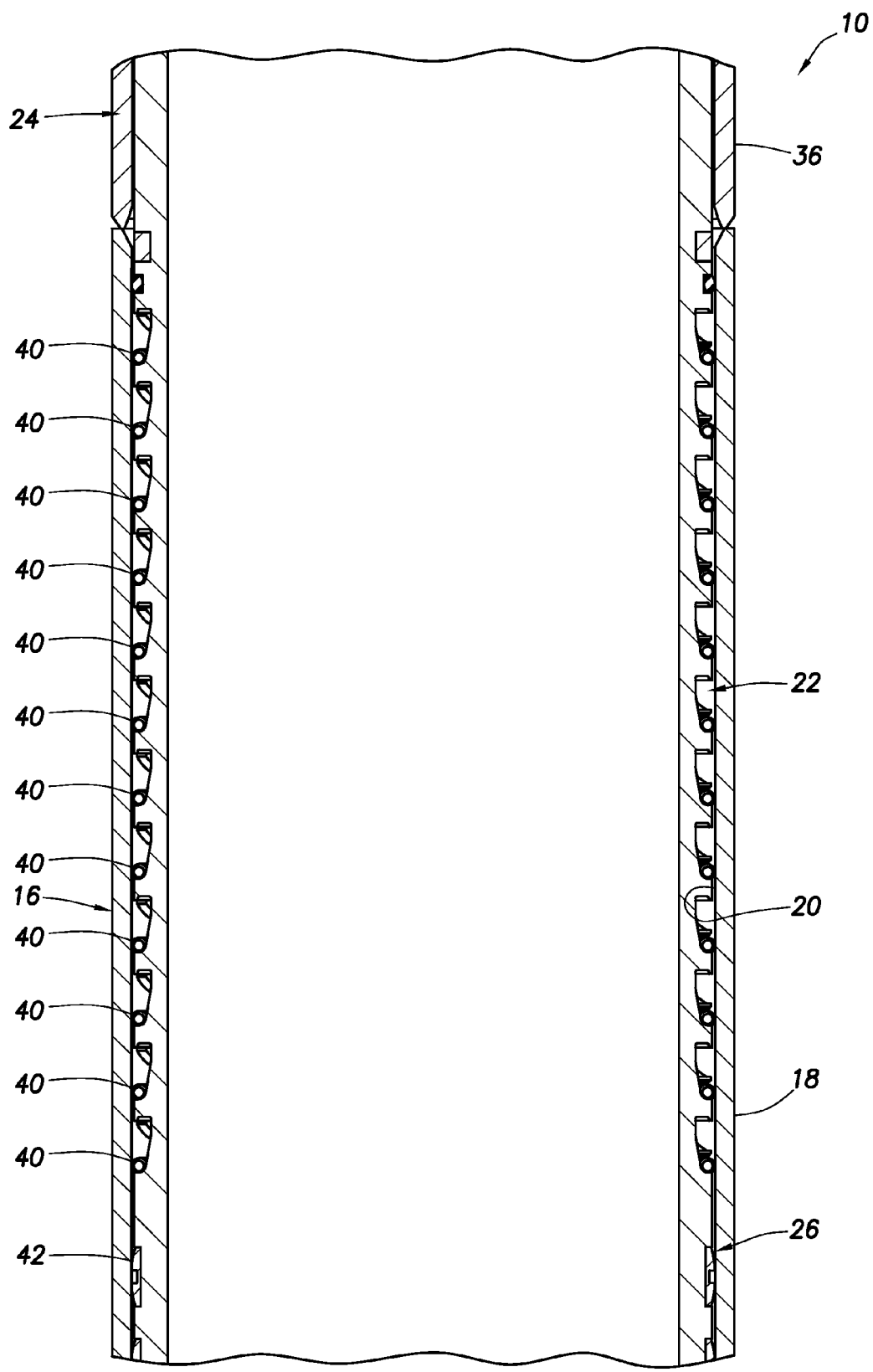
FIG. 4 is an enlarged scale schematic cross-sectional view of the stinger fully received in the tie back receptacle.

In FIG. 4, the stinger 34 is representatively illustrated fully received within the bore 20. The latches 40 now grippingly engage the surface of the bore 20, thereby preventing removal of the stinger 34 from the receptacle 18, without the necessity of the latches 40 being received in any grooves, threads or other recesses formed into the surface of the bore.

Figures 5, 6:
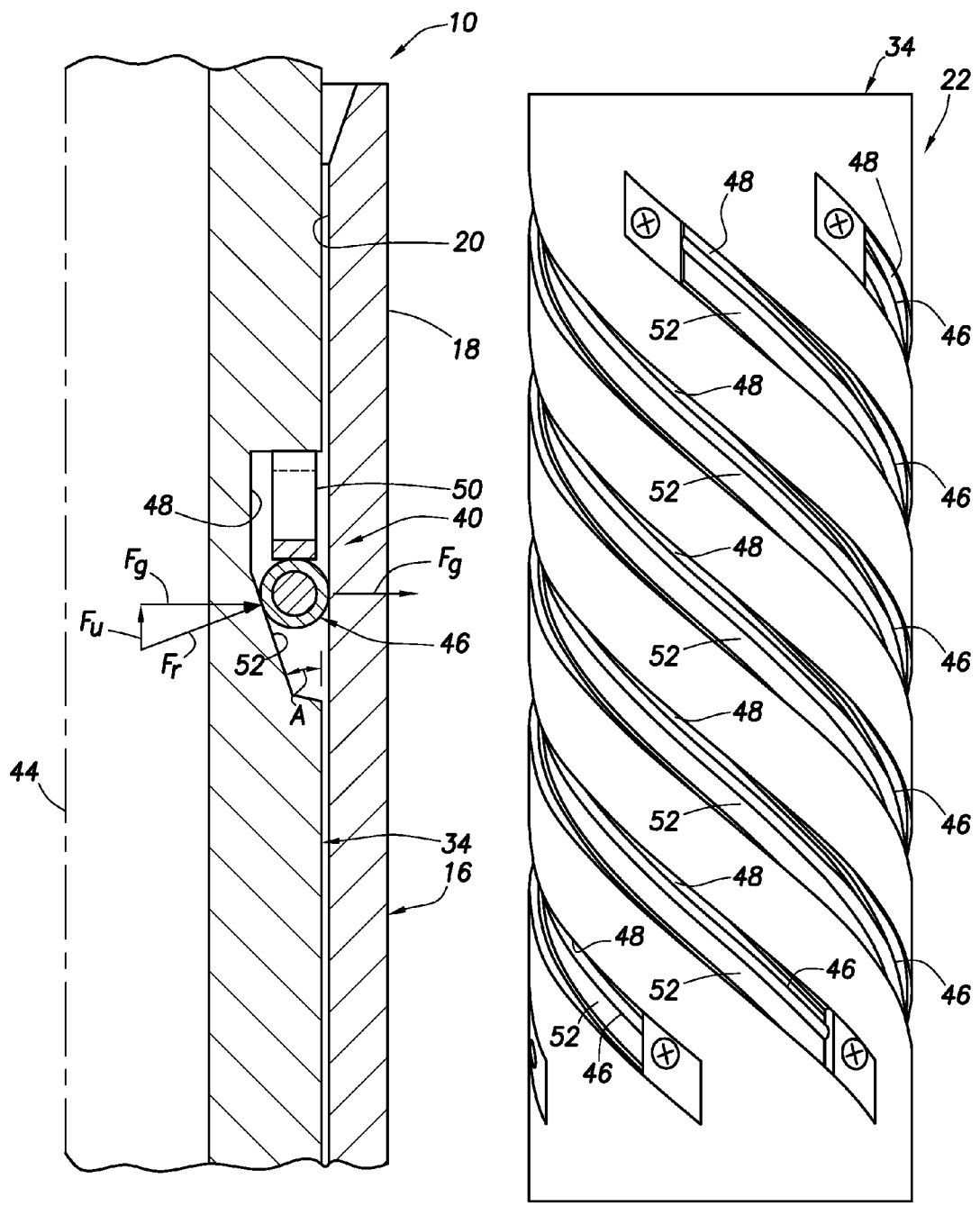
FIG. 5 is a further enlarged scale schematic cross-sectional view of a latch on the stinger engaging a seal bore of the receptacle.
FIG. 6 is an elevational view of a helically configured latch assembly for use on the stinger.

Referring additionally now to FIG. 5, an enlarged scale cross-sectional view of one of the latches 40 is schematically depicted within the bore 20 of the receptacle 18, so that the manner in which the latch grips the bore can be more clearly seen. Note that, in this example, the latch 40 prevents upward displacement of the stinger 34 relative to the receptacle 18 along a longitudinal axis 44 of the stinger, but downward displacement of the stinger relative to the receptacle is permitted.

The latch 40 includes a wedge device 46 received in a circumferentially extending recess 48. A biasing device 50 (such as a circumferentially extending wave spring) biases the wedge device 46 across a surface of a ramp 52, thereby radially outwardly urging the wedge device into contact with the surface of the bore 20.

Preferably, an incline angle A of the ramp 52 is less than the so-called friction angle due to the coefficient of friction between the wedge device 46 and the surface of the bore 20. Thus, a force Fu used in an attempt to displace the stinger 34 upward relative to the receptacle 18 will produce a gripping force Fg from the wedge device 46 to the surface of the bore 20, with a resultant force Fr preventing upward displacement of the stinger. Theoretically, no amount of force Fu will be sufficient to displace the stinger 34 upward relative to the receptacle 18, without deforming or destroying the latch 40 or the receptacle.

Preferably, the wedge device 46 rotates as it displaces across the surface of the ramp 52 to inwardly or outwardly displace relative to the recess 48. This provides for convenient and simple actuation of the latch 40 to retract when the latch is inserted into the bore, and to grip the bore 20 when any attempt is made to upwardly displace the stinger 34. However, the wedge device 46 could slide or otherwise displace across the ramp 52 in other examples, if desired.

Referring additionally now to FIG. 6, another configuration of the latch assembly 22 is representatively illustrated, apart from the remainder of the stinger 34 and extension 24. In this configuration, the latches 40 extend both circumferentially and longitudinally, and thus helically, about the stinger 34.

One advantage of the latch assembly 22 of FIG. 6 is that it can be conveniently released from gripping engagement with the surface of the bore 20 if it should ever be desired to withdraw the stinger 34 from the receptacle 18. In order to release the latch assembly 22, the extension 24 would be rotated to the right (clockwise as viewed from above) while picking up on the extension.

The right-hand rotation displaces the wedge device 46 relative to the ramp 52 so that the wedge device is not forced into gripping engagement with the surface of the bore 20 as the extension 24 is raised. That is, the ramp 52 is displaced out from under the wedge device 46 so that the wedge device can retract into the recess 48 when the stinger 34 is rotated to the right. Of course, the latch assembly 22 could be configured to release in response to left-hand rotation of the stinger 34, if desired.

Referring additionally now to FIGS. 7-10, examples of various configurations of the wedge device 46 are representatively illustrated. These examples demonstrate that the principles of this disclosure are not limited to any particular configuration of any of the elements of the system 10. Instead, a wide variety of possible variations exist.

Figure 7:
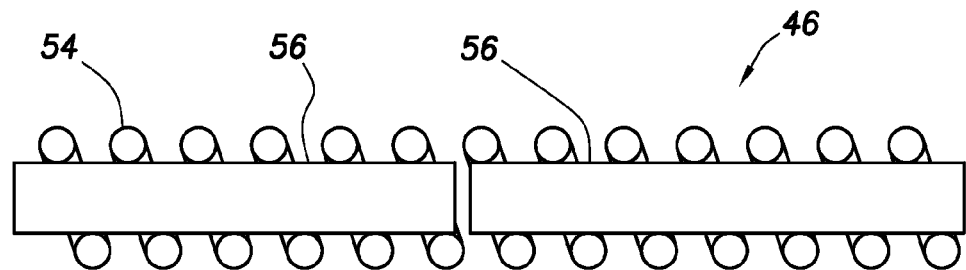
FIGS. 7-10 are enlarged scale schematic views of various configurations of a wedge device of the latch assembly.

In FIG. 7, the wedge device 46 is similar to the one depicted in FIG. 5. The wedge device 46 includes a spirally wound spring 54 and a generally cylindrical support 56. The support 56 provides radially outward support, and thereby prevents crushing of, the spring 54. As depicted in FIG. 7, there may be multiple sections of supports 56, so that the wedge device 46 is resilient overall and can extend circumferentially relative to the stinger 34.

Figure 8:
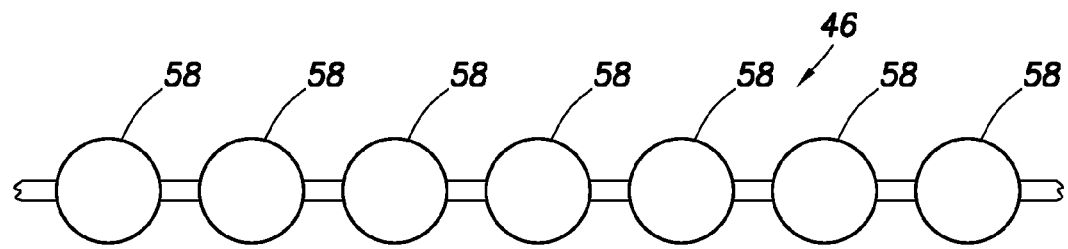
Figure 9:
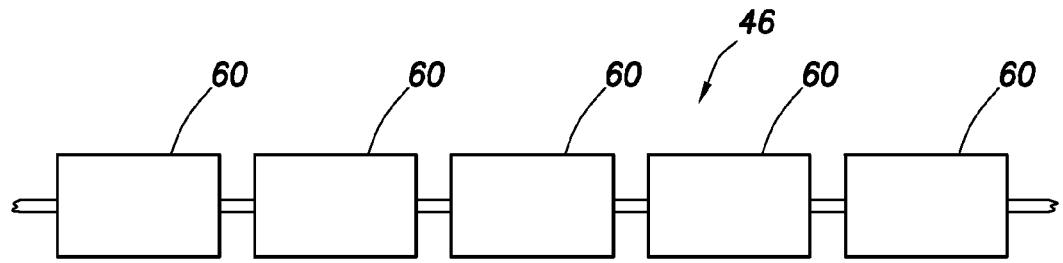
Figure 10:
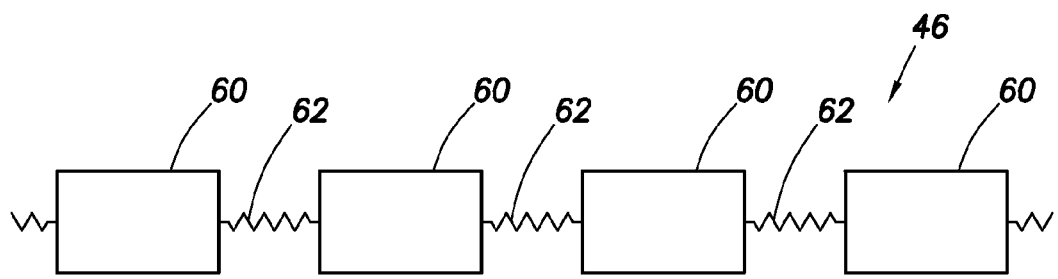

In FIG. 8, the wedge device 46 comprises a ball chain having multiple interconnected balls 58. In FIG. 9, the wedge device comprises a chain of rollers 60. In order to make the wedge devices 46 of FIGS. 8 & 9 resilient, biasing devices 62 (such as extension springs) could be used to interconnect the balls 58 or rollers 60, as depicted in FIG. 10.

Note that, although the above examples of the latch assembly 22 include the latches 40 extending completely circumferentially about the stinger 34, other examples could use a latch assembly which does not extend completely circumferentially about the stinger 34. Such a configuration could be used, for example, to induce direct contact and resulting gripping friction between the outer surface of the stinger 34 and the inner surface of the bore 20. One benefit of this configuration would be to reduce or eliminate relative motion between the stinger 34 and bore 20, and thereby reduce wear on the seals 42.

It may now be fully appreciated that the above disclosure provides several advancements to the art of securing well tools to smooth bores. Because of these advancements, it is not necessary to cut any grooves, threads or other recesses into the surface of the bore. Furthermore, the above disclosure provides a latch assembly which is convenient, reliable and economical to produce and use.

The above disclosure provides a tie back receptacle extension 24 which includes a stinger 34 having a smooth bore latch assembly 22 carried thereon. The smooth bore latch assembly 22 includes a wedge device 46 and a ramp 52 which outwardly displaces the wedge device for securing the stinger within a substantially smooth bore 20.

The tie back receptacle extension 24 may also include a tie back receptacle 28 attached to the stinger 34. The stinger 34 may have a seal assembly 26 carried thereon.

The wedge device 46 may rotate when the ramp 52 displaces the wedge device outward. A biasing device 50 may bias the wedge device 46 across the ramp 52, thereby enabling the wedge device to engage the smooth bore 20.

The wedge device 46 may include at least one spring 54 extending circumferentially relative to the stinger 34. The wedge device 46 may include at least one generally cylindrical roller 60 extending circumferentially relative to the stinger 34. The wedge device 46 may include at least one ball 58.

The wedge device 46 and the ramp 52 may extend helically on the stinger 34.

Also provided by the above disclosure is a smooth bore latch assembly 22 which includes at least one spiral wound spring 54 and at least one recess 48 in which the spring is received. The recess 48 and the spring 54 therein extend circumferentially relative to a stinger 34. A ramp 52 is operative to outwardly displace the spring 54 relative to the recess 48 in response to displacement of the spring relative to the ramp 52.

The smooth bore latch assembly 22 may also include at least one generally cylindrical support 56 received within the spring 54. Multiple supports 56 may be received within the spring 54.

The smooth bore latch assembly 22 may also include a biasing device 50 which biases the spring 54 across the ramp 52. The biasing device 50 may comprise a wave spring. The biasing device 50 may bias the spring 54 across the ramp 52 a sufficient distance to outwardly extend the spring from the recess 48.

The recess 48 and the spring 54 may extend helically relative to the stinger 34.

Also provided by the above disclosure is a method of securing a stinger 34 within a substantially smooth bore 20. The method includes the steps of: providing a latch assembly 22 on the stinger 34; inserting the stinger 34 into the bore 20; and engaging the latch assembly 22 with the bore 20, thereby securing the stinger 34 relative to the bore, without the latch assembly engaging any recess formed in the bore.

The engaging step may include displacing a wedge device 46 across a ramp 52 of the latch assembly 22, thereby outwardly extending the wedge device into gripping engagement with the bore 20.

The wedge device 46 displacing step may include rotating the wedge device along a surface of the ramp 52. The wedge device 46 displacing step may include using a biasing device 50 to bias the wedge device across the ramp 52.

The method may include the step of releasing the latch assembly 22 from engagement with the bore 20 by rotating the stinger 34 about a longitudinal axis 44 of the stinger.

Of course, a person skilled in the art would, upon a careful consideration of the above description of representative embodiments, readily appreciate that many modifications, additions, substitutions, deletions, and other changes may be made to these specific embodiments, and such changes are within the scope of the principles of the present disclosure. Accordingly, the foregoing detailed description is to be clearly understood as being given by way of illustration and example only, the spirit and scope of the present invention being limited solely by the appended claims and their equivalents.

What is claimed is:

1. A tie back receptacle extension, comprising:
   a stinger having a smooth bore latch assembly carried thereon, the smooth bore latch assembly including a wedge device and a ramp which outwardly displaces the wedge device for securing the stinger within a substantially smooth bore; and
   a tie back receptacle attached to the stinger.

2. The tie back receptacle extension of claim 1, wherein the stinger includes a seal assembly carried thereon.

3. The tie back receptacle extension of claim 1, wherein the wedge device rotates when the ramp displaces the wedge device outward.

4. The tie back receptacle extension of claim 1, wherein the wedge device comprises at least one spring extending circumferentially relative to the stinger.

5. The tie back receptacle extension of claim 1, wherein the wedge device comprises at least one generally cylindrical roller extending circumferentially relative to the stinger.

6. The tie back receptacle extension of claim 1, wherein the wedge device comprises at least one ball.

7. The tie back receptacle extension of claim 1, wherein the wedge device and the ramp extend helically on the stinger.

8. A tie back receptacle extension, comprising:
   a stinger having a smooth bore latch assembly carried thereon, the smooth bore latch assembly including a wedge device and a ramp which outwardly displaces the wedge device for securing the stinger within a substantially smooth bore; and
   a biasing device which biases the wedge device across the ramp, thereby enabling the wedge device to engage the bore.

9. A latch assembly for engaging a substantially smooth bore, the latch assembly comprising:
at least one spiral wound spring;
at least one recess in which the spring is received, the recess and the spring therein extending circumferentially relative to a stinger; and
a ramp operative to outwardly displace the spring relative to the recess in response to displacement of the spring relative to the ramp.

10. The smooth bore latch assembly of claim 9, further comprising at least one generally cylindrical support received within the spring.

11. The smooth bore latch assembly of claim 9, wherein multiple supports are received within the spring.

12. The smooth bore latch assembly of claim 9, further comprising a biasing device which biases the spring across the ramp.

13. The smooth bore latch assembly of claim 12, wherein the biasing device comprises a wave spring.

14. The smooth bore latch assembly of claim 12, wherein the biasing device biases the spring across the ram a sufficient distance to outwardly extend the spring from the recess.

15. The smooth bore latch assembly of claim 9, wherein the recess and the spring extend helically relative to the stinger.

16. A method of securing a stinger within a substantially smooth bore, the method comprising the steps of:
providing a latch assembly on the stinger, the latch assembly including a wedge device and a biasing device which biases the wedge device to extend outwardly from a recess in an outer surface of the stinger;
inserting the stinger into the bore; and
engaging the latch assembly with the bore, thereby securing the stinger relative to the bore, without the latch assembly engaging any recess formed in the bore.

17. The method of claim 16, wherein the engaging step further comprises displacing the wedge device across a ramp of the latch assembly, thereby outwardly extending the wedge device into gripping engagement with the bore.

18. The method of claim 17, wherein the wedge device displacing step further comprises rotating the wedge device along a surface of the ramp.

19. The method of claim 17, wherein the wedge device displacing step further comprises using the biasing device to bias the wedge device across the ramp.

20. A method of securing a stinger within a substantially smooth bore, the method comprising the steps of:
providing a latch assembly on the stinger;
inserting the stinger into the bore;
engaging the latch assembly with the bore, thereby securing the stinger relative to the bore, without the latch assembly engaging any recess formed in the bore; and
releasing the latch assembly from engagement with the bore by rotating the stinger about a longitudinal axis of the stinger.

* * * * *